(12) United States Patent
Corzani et al.

(10) Patent No.: US 7,799,431 B2
(45) Date of Patent: Sep. 21, 2010

(54) LIQUID IMPERMEABLE, MOISTURE VAPOUR PERMEABLE LAYERS AND FILMS COMPRISING THERMOPLASTIC HYDROPHILIC POLYMERIC COMPOSITIONS

(75) Inventors: Italo Corzani, Chieti (IT); Calum MacBeath, Francavilla al Mare (IT)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 10/402,436

(22) Filed: Mar. 28, 2003

(65) Prior Publication Data

US 2003/0194566 A1    Oct. 16, 2003

(30) Foreign Application Priority Data

Apr. 12, 2002  (EP)  ................................. 02008366

(51) Int. Cl.
  B32B 27/22   (2006.01)
  B32B 27/34   (2006.01)
  B32B 27/40   (2006.01)

(52) U.S. Cl. .............. 428/411.1; 428/423.1; 428/474.4; 428/480; 428/500; 428/522; 428/532; 524/291; 524/155; 525/178

(58) Field of Classification Search .................. 525/178; 524/291, 155; 428/411.1, 423.1, 474.4, 480, 428/500, 522, 532
See application file for complete search history.

(56) References Cited

U.S. PATENT DOCUMENTS

| 3,929,135 | A |   | 12/1975 | Thompson |
| 4,207,402 | A | * | 6/1980  | Sprenkle, Jr. ................ 521/139 |
| 4,493,870 | A |   | 1/1985  | Vrouenraets et al. |
| 4,591,523 | A |   | 5/1986  | Thompson |
| 4,637,819 | A |   | 1/1987  | Ouellette et al. |
| RE32,649  | E |   | 4/1988  | Brandt et al. |
| 4,902,565 | A | * | 2/1990  | Brook ...................... 428/315.5 |
| 4,938,752 | A |   | 7/1990  | Vrouenraets et al. |
| 4,957,966 | A | * | 9/1990  | Nishio et al. .................. 525/66 |
| 4,977,892 | A |   | 12/1990 | Ewall |
| 5,070,145 | A | * | 12/1991 | Guerdoux .................. 525/179 |
| 5,286,770 | A |   | 2/1994  | Bastioli et al. |
| 5,422,387 | A | * | 6/1995  | Toms et al. .................... 524/52 |
| 5,436,078 | A | * | 7/1995  | Buhler et al. ............. 428/474.4 |
| 5,445,875 | A |   | 8/1995  | Persson |
| 5,447,783 | A |   | 9/1995  | Horn |
| 5,532,053 | A |   | 7/1996  | Mueller |
| 5,674,579 | A | * | 10/1997 | Ladouce et al. ............ 428/35.7 |
| 5,747,588 | A |   | 5/1998  | Mann |
| 5,900,471 | A | * | 5/1999  | Glans ........................ 528/170 |
| 6,162,382 | A | * | 12/2000 | Kent et al. ............. 264/172.12 |
| 6,177,482 | B1|   | 1/2001  | Cinelli et al. |
| 6,224,961 | B1| * | 5/2001  | Hsueh et al. .................. 428/72 |
| 6,225,404 | B1| * | 5/2001  | Sorensen et al. ........... 525/54.1 |
| 6,290,611 | B1| * | 9/2001  | Rajagopalan et al. ....... 473/371 |
| 6,534,572 | B1| * | 3/2003  | Ahmed et al. ............... 524/275 |
| 6,544,642 | B2|   | 4/2003  | Cinelli et al. |
| 2002/0142115 | A1 | * | 10/2002 | Sugiura ..................... 428/35.2 |
| 2003/0100656 | A1 | * | 5/2003  | Majumdar et al. .......... 524/445 |
| 2003/0194566 | A1 | * | 10/2003 | Corzani et al. ........... 428/424.2 |
| 2005/0142309 | A1 | * | 6/2005  | Goto et al. ................. 428/34.6 |
| 2005/0148183 | A1 | * | 7/2005  | Shiro et al. ................. 438/692 |

FOREIGN PATENT DOCUMENTS

| EP | 0 293 482  | B1 |   | 7/1994  |
| EP | 0 747 442  | A2 |   | 12/1996 |
| EP | 0964026    |    | * | 12/1999 |
| EP | 1106114    |    | * | 12/1999 |
| EP | 1 013 291  | A1 |   | 6/2000  |
| EP | 1 106 114  | A1 |   | 6/2001  |
| GB | 2024100    | A  |   | 1/1980  |
| WO | WO 95/16746 | A1 |  | 6/1995  |
| WO | WO 96/25902 | A1 |  | 8/1996  |
| WO | WO 99/64077 | A1 |  | 12/1999 |
| WO | WO 99/64505 | A1 |  | 12/1999 |
| WO | WO 01/97870 | A1 |  | 12/2001 |
| WO | WO 01/98399 | A1 |  | 12/2001 |

OTHER PUBLICATIONS

Grant et al., Grant and Hackh's Chemical Dictionary, p. 616, 1969.*

* cited by examiner

Primary Examiner—Jeffrey C Mullis

(57) ABSTRACT

The present invention relates to liquid impermeable, moisture vapour permeable film or layers comprising thermoplastic hydrophilic polymeric compositions. The thermoplastic compositions comprise selected thermoplastic hydrophilic polymers, selected compatible plasticisers, and selected functionalized copolymers that provide the resulting film or layer with an increased mechanical strength, and better bonding capability to a substrate, without impairing the moisture vapour permeability of said films or layers. The layers and films of the present invention made from the thermoplastic hydrophilic polymeric compositions can find a variety of applications wherein liquid imperviousness and moisture vapour permeability are desirable.

26 Claims, No Drawings

LIQUID IMPERMEABLE, MOISTURE VAPOUR PERMEABLE LAYERS AND FILMS COMPRISING THERMOPLASTIC HYDROPHILIC POLYMERIC COMPOSITIONS

FIELD OF THE INVENTION

The present invention relates to liquid impermeable, moisture vapour permeable layers or films comprising thermoplastic hydrophilic polymeric compositions. The layers or films of the present invention can find a variety of applications wherein moisture vapour permeability and liquid imperviousness are desirable.

BACKGROUND OF THE INVENTION

Thermoplastic films which provide a liquid barrier in addition to providing moisture vapour permeability are known in the art. Particularly preferred are hydrophilic continuous films that do not allow the flow of moisture vapour through open pores or apertures in the material, but do transfer substantial amounts of moisture vapour through the film by absorbing water on one side of the film where the moisture vapour concentration is higher, and desorbing or evaporating it on the opposite side of the film where the moisture vapour concentration is lower. Such films are typically formed from a thermoplastic polymeric composition comprising a thermoplastic hydrophilic polymer, or a blend of thermoplastic hydrophilic polymers. Thermoplastic hydrophilic polymeric compositions having the above described characteristics are also known in the art as "monolithic compositions", and the moisture vapour permeable, liquid impermeable layers or films made therefrom are known as "monolithic layers" or "monolithic films".

For example WO 95/16746 discloses films prepared from mixtures of a) block copolyether ester, block copolyether amides (e.g. Pebax™) and or polyurethane and b) thermoplastic polymer which is incompatible with a, and c) a compatibiliser. The films are liquid impermeable and have moisture vapour permeability of about 700 g/m² day. Also, U.S. Pat. No. 5,447,783 discloses a vapour permeable water resistant multi component film structure having at least three layers. The outer layers are hydrophobic copolyetherester elastomers having a thickness of 1.3-7.6 micrometers and a WVTR of 400-2500 g/m² 24 h and the inner layer is a hydrophilic copolyetherester elastomer having a thickness of 7.6-152 micrometers and a WVTR of at least 3500 g/m² 24 h.

U.S. Pat. No. 5,445,875 discloses a waterproof, bloodproof and virusproof breathable laminate. The laminate comprises a woven/nonwoven fabric and an extruded film such as Hytrel™ having a thickness of about 1 mil (25.4 micrometers).

U.S. Pat. No. 5,532,053 discloses a high moisture transmission medical film which can be laminated onto a non-woven material. The laminate film comprises a first layer of polyetherester copolymer and second and third layers selected from a specified group of polymers. The film has a MVTR of greater than 750 g/m² 24 h (ASTM F1249) and a thickness of less than 1 mil (25.4 micrometer) preferably 0.6 mil to 0.75 mil (15-19 micrometers).

U.S. Pat. No. 4,938,752 discloses absorbent articles comprising films of copolyether esters which have reduced water permeability, a water vapour permeability of 500 g/m² 24 h (as measured in a specified described test) and a thickness of 5-35 micrometers. There is no disclosure of a supportive substrate.

U.S. Pat. No. 4,493,870 discloses a flexible layered waterproof product comprising a textile material covered with a film of a copolyetherester having an MVTR of at least 1000 g/m² 24 h (ASTM E96- 66) having a thickness of 5 to 35 micrometers.

GB 2024100 discloses a flexible layered water resistant article comprising a microporous hydrophobic outer layer which is moisture vapour permeable but resists liquids and a hydrophilic inner layer of polyetherpolyurethane having a MVTR of above 1000 g/m² 24 h.

In our patent applications WO 99/64077 entitled "Low viscosity thermoplastic compositions for moisture vapour permeable structures and the utilisation thereof in absorbent articles", and WO 99/64505 entitled "Low viscosity thermoplastic compositions for structures with enhanced moisture vapour permeability and the utilisation thereof in absorbent articles", thermoplastic hydrophilic polymeric compositions comprising a thermoplastic hydrophilic polymer, or a blend of thermoplastic hydrophilic polymers, are disclosed for making hydrophilic continuous moisture vapour permeable, liquid impermeable films or layers having preferred characteristics of moisture vapour permeability and liquid imperviousness. The disclosed preferred thermoplastic hydrophilic polymeric compositions are also readily processable so as to provide a coating having the desired thickness onto a substrate, so avoiding the need of complex traditional extrusion apparatuses. This is achieved by modifying the viscosity of the thermoplastic hydrophilic polymers by means of the inclusion in the composition of a suitable plasticiser or blend of plasticisers that lowers such viscosity. This allows to utilise with these preferred compositions typical process conditions known in the art for the direct coating of low viscosity hot melt compositions onto a substrate in order to form a moisture vapour permeable, liquid impervious film or layer.

Particularly preferred hydrophilic plasticisers are described in WO 99/64505, which, in addition to adjusting the viscosity of the compositions, also provide the thermoplastic hydrophilic polymeric compositions with a further benefit in terms of moisture vapour permeability.

As shown in the two prior art documents cited above, our thermoplastic hydrophilic polymeric compositions ("monolithic compositions") are particularly suitable for the manufacture of typically continuous layers or films to be used as such, and which are moisture vapour permeable and liquid impermeable, as well as of composite laminated structures wherein one or more typically continuous layers of the thermoplastic hydrophilic polymeric composition are connected to one or more different substrates, for example a fibrous layer such as a nonwoven fabric, said composite laminated structures typically also being moisture vapour permeable and liquid impermeable. The above compositions are formulated as low viscosity hot melt formulations, and are typically processed, in order to prepare layers or films or laminates, in the molten state, e.g. by known hot melt coating techniques. Alternatively, emulsion or solution processes are also available for similar thermoplastic hydrophilic polymeric compositions as those disclosed in our patent applications WO 01/97870 and WO 01/98399, respectively entitled "Thermoplastic hydrophilic polymeric compositions with low water solubility component" and "Thermoplastic hydrophilic polymeric compositions with high water solubility component".

While the thermoplastic hydrophilic polymeric compositions disclosed in our patent applications cited above are particularly suitable since they are easily processable and can also provide films and layers, which can also be incorporated into laminated structures having good characteristics of liquid imperviousness and moisture vapour permeability, they can be further improved in order to achieve even better characteristics, namely in terms of mechanical properties.

The above compositions in fact typically comprise relatively high amounts of plasticiser, in order to both adjust the viscosity in the molten state, and also to provide a higher moisture vapour permeability. However, such relatively high amounts of plasticiser can lead to films and layers having mechanical properties which can be too low for certain product applications where high stresses and/or strains can be applied in use. For example, the compositions can be comprised as films or layers as such, or alternatively incorporated in composite laminated structures, in e.g. disposable absorbent articles such as sanitary napkins or pantiliners, or disposable baby diapers. It may happen, in certain usage conditions of said articles, that high stresses are applied to the film, layer or laminated structure comprised in the article, therefore causing possible rupturing of the film or layer, and/or a delamination in the laminated structure, i.e. at least a partial detachment of the thermoplastic layer or film from one substrate.

Addition of suitable tackifier resins to the thermoplastic hydrophilic polymeric composition can provide a better bonding of a film or layer comprising the composition to a substrate, but does not increase the mechanical strength of a film or layer per se made of the thermoplastic hydrophilic polymeric composition.

Moreover, addition of a relatively high amount of tackifier resin can lead to a composition having residual permanent tackiness, which may not be preferred in certain product applications. Addition of some tackifying resins in relatively high amounts can also influence negatively the overall moisture vapour permeability of the resulting film or layer.

It is therefore an object of the present invention to provide a film or layer comprising a thermoplastic hydrophilic polymeric composition, which is liquid impermeable, and has a high moisture vapour permeability, and which also has increased mechanical properties, particularly in terms of a better mechanical strength.

It is a further object of the present invention to provide a liquid impermeable, moisture vapour permeable film or layer which, when comprised into a composite laminated structure, by being suitably bonded to at least a substrate, e.g. a nonwoven, preferably by direct coating onto said substrate, has a better bonding strength, i.e., a higher resistance to delamination under the stresses and strains typically encountered under usage conditions of said laminated structures, therefore providing a stronger composite laminated structure.

It is still a further object of the present invention to provide a liquid impermeable, moisture vapour permeable film or layer having the characteristics as stated above, without a residual permanent tackiness which may be undesirable in certain product applications.

It has been surprisingly discovered that, by including selected suitable functionalized copolymers in the thermoplastic hydrophilic polymeric compositions, comprising selected hydrophilic polymer or polymers and selected suitable compatible plasticiser or plasticisers, a liquid impermeable, moisture vapour permeable film or layer can be obtained from said compositions, which film or layer has an increased mechanical strength, and preferably also an increased bonding strength, when incorporated into a composite laminated structure, particularly when said thermoplastic hydrophilic polymeric composition is applied in the molten state to said substrate, for example by hot melt coating.

Further advantages of the films or layers according to the present invention will be illustrated in the following description and examples.

SUMMARY OF THE INVENTION

The present invention relates to a liquid impermeable, moisture vapour permeable layer or film comprising a thermoplastic hydrophilic polymeric composition comprising:
  a thermoplastic hydrophilic polymer or a mixture of thermoplastic hydrophilic polymers selected from the group consisting of polyurethanes, poly-ether-amide block copolymers, polyester-amide block copolymers, polyethylene oxide and its copolymers, poly lactide and copolymers, (co)polyamides, (co)polyesters, polyester block copolymers, sulfonated polyesters, poly-ether-ester block copolymers, poly-ether-ester-amide block copolymers, polyacrylates, polyacrylic acids and derivatives, polyethylene-vinyl acetate with a vinyl acetate content of at least 28% by weight, polyvinyl alcohol and its copolymers, polyvinyl ethers and their copolymers, poly-2-ethyl-oxazoline and derivatives, polyvinyl pyrrolidone and its copolymers, thermoplastic cellulose derivatives, poly glycolide, polyureas, and mixtures thereof.
  a functionalized copolymer or a blend of functionalized copolymers containing functional groups capable of interacting with the thermoplastic hydrophilic polymer or mixture of thermoplastic hydrophilic polymers, and
  a suitable compatible plasticiser, or a blend of suitable compatible plasticisers.

DETAILED DESCRIPTION OF THE INVENTION

By saying "thermoplastic hydrophilic polymer" it is herein intended a thermoplastic polymer capable of forming a continuous film or layer that does not allow the flow of moisture vapour through open pores or apertures in the material, but does transfer substantial amounts of moisture vapour through the film or layer by absorbing water on one side of the film or layer where the moisture vapour concentration is higher, and desorbing or evaporating it on the opposite side of the film or layer where the moisture vapour concentration is lower (monolithic films or layers, as explained herein in the Background of the Invention). "Thermoplastic hydrophilic polymer" is therefore to be considered synonymous of "thermoplastic monolithic polymer" in the present description.

The terms "breathable" and "breathability" are intended herein to correspond to "moisture vapour permeable" or "water vapour permeable", and "moisture vapour permeability" or "water vapour permeability", referred to "monolithic compositions" and "monolithic layers or films" as defined in the Background of the Invention. "Moisture vapour" and "water vapour" are also considered to be equivalent.

According to the present invention, the thermoplastic polymeric hydrophilic compositions comprised in the moisture vapour permeable, liquid impervious films or layers at least comprises a thermoplastic hydrophilic polymer or a mixture of thermoplastic hydrophilic polymers, a suitable compatible plasticiser, or a blend of suitable compatible plasticisers, and a functionalized copolymer or a blend of functionalized copolymers as explained below.

Suitable thermoplastic hydrophilic polymers comprised in the composition comprised in the films or layers according to the present invention include polyurethanes, poly-ether-amide block copolymers, polyester-amide block copolymers, polyethylene oxide and its copolymers, poly lactide and copolymers, (co)polyamides, (co)polyesters, polyester block copolymers, sulfonated polyesters, poly-ether-ester block copolymers, poly-ether-ester-amide block copolymers, polyacrylates, polyacrylic acids and derivatives, polyethylene-vinyl acetate with a vinyl acetate content of at least 28% by weight, polyvinyl alcohol and its copolymers, polyvinyl ethers and their copolymers, poly-2-ethyl-oxazoline and derivatives, polyvinyl pyrrolidone and its copolymers, thermoplastic cellulose derivatives, poly glycolide, polyureas, and mixtures thereof.

Preferred thermoplastic hydrophilic polymers are polyurethanes, (co)polyesters, polyester-amide block copolymers, polyether-amide block copolymers, polyether-ester-amide block copolymers and polyether-ester block copolymers, and mixtures thereof.

Particularly preferred thermoplastic hydrophilic polymers are poly-ether-amide block copolymers (e.g. Pebax™), polyether-ester block copolymers (e.g. Hytrel™), polyurethanes (e.g. Estane™), or mixtures thereof.

The thermoplastic hydrophilic polymeric compositions comprised in the films or layers of the present invention comprise, in addition to the thermoplastic hydrophilic polymer or mixture of thermoplastic hydrophilic polymers as explained above, a functionalized copolymer or a blend of functionalized copolymers containing functional groups capable of interacting with the thermoplastic hydrophilic polymer or mixture of thermoplastic hydrophilic polymers, e.g., capable of forming chemical bonds, (ionic or covalent), with said thermoplastic hydrophilic polymer or polymers.

The functional groups can consist in functional group-containing comonomers which are present in the structure of the functionalized copolymer via terpolymerisation or grafting. Preferred examples of functionalized copolymers according to the present invention are ethylene-(meth)acrylic acid copolymers, ethylene acrylic ester and ethylene methacrylic ester copolymers, ionomers, ethylene-vinyl ester-(meth)acrylic acid copolymers, ethylene-acrylic ester-(meth)acrylic acid copolymers, ethylene-vinyl ester-maleic anhydride copolymers, ethylene-acrylic ester-maleic anhydride copolymers, ethylene-vinyl ester-glycidyl methacrylate copolymers, ethylene-acrylic ester-glycidyl methacrylate copolymers, ethylene-maleic anhydride copolymers, ethylene-glycidyl methacrylate copolymers, styrene-maleic anhydride copolymers, styrene-glycidyl methacrylate copolymers, styrene-ethylene-butylene-maleic anhydride copolymers, and mixtures thereof. Copolymers of ethylene with comonomers containing said functional groups are preferred.

Among the above mentioned, particularly preferred are ethylene-(meth)acrylic acid copolymers, ionomers, ethylene-vinyl ester-(meth)acrylic acid copolymers, ethylene-acrylic ester-maleic anhydride copolymers, ethylene-vinyl acetate-maleic anhydride copolymers, ethylene-acrylic ester-glycidyl methacrylate copolymers, ethylene-glycidyl methacrylate copolymers.

Even more preferred are ethylene-acrylic acid copolymers, such as those sold under the trade names Primacor™ by Dow chemical and Nucrel™ by Dupont, ethylene-acrylic ester-maleic anhydride copolymers, such as that sold under the trade name Lotader™ 4700 by Atofina, ethylene-vinyl acetate-maleic anhydride copolymers, such as that sold under the trade names Fusabond™ 190-D by Dupont, ethylene-acrylic ester-glycidyl methacrylate copolymers, such as those sold under the trade names Elvaloy™ PTW by Dupont and Lotader™ 8900 by Atofina, ethylene-acrylic ester-acrylic acid copolymers, such as those sold under the trade name Bynel™ 2002TW by Dupont and ethylene-(meth)acrylic acid ionomers such as those sold under the trade names Surlyn™ by Dupont and lotek™ by Exxon.

The thermoplastic hydrophilic polymeric compositions comprised in the films or layers of the present invention further comprise a suitable compatible plasticiser, or a blend of suitable compatible plasticisers, as will be explained hereinbelow.

The thermoplastic hydrophilic polymers or mixture of thermoplastic hydrophilic polymers as mentioned above, comprised in the thermoplastic hydrophilic polymeric composition comprised in the films or layers of the present invention, can be typically highly viscous in the molten state at the process conditions that are typical of the known processes of film or layer formation, e.g. an extrusion process involving a high power screw extruder. For example they may have a viscosity higher than 5000 poise at a temperature of 20° C. above the DSC (Differential Scanning Calorimetry) melting point, which is the temperature identified as that corresponding to the DSC peak, or corresponding to the highest DSC peak in case of a mixture of polymers showing more than one peak, and at a frequency of 1 rad/sec.

The thermoplastic hydrophilic polymeric compositions comprised in the films or layers of the present invention, comprising the thermoplastic hydrophilic polymer(s) and the functionalized copolymer or copolymers containing the functional groups, can therefore still be highly viscous in the molten state at the process conditions.

According to a preferred embodiment of the present invention, and as disclosed in our patent applications WO 99/64077 or WO 99/64505, the viscosity of the thermoplastic polymeric hydrophilic compositions comprised in the films or layers of the present invention can be preferably adjusted by including in the thermoplastic hydrophilic polymeric composition a suitable plasticiser, or blend of suitable plasticisers, that is compatible with the thermoplastic hydrophilic polymer or polymers and, also, with the functionalized copolymer or copolymers and that lowers the viscosity of the thermoplastic hydrophilic polymeric composition in the molten state at the process conditions.

Viscosity of the thermoplastic hydrophilic polymeric compositions comprised in the films or layers of the present invention can therefore be adjusted by suitably selecting the plasticiser, depending on how the composition is to be processed. For example film extrusion techniques can be suitably used with compositions having higher viscosity at the process conditions, as it is known in the art. Alternatively, suitable hot melt coating processes can be preferred to process the compositions, as explained in the above mentioned patent applications WO 99/64077 and WO 99/64505. This implies that the viscosity in the thermoplastic hydrophilic polymeric composition at the process conditions has to be adjusted to a suitable lower level.

In such a case, the thermoplastic polymeric hydrophilic compositions of this alternative embodiment of the present invention comprise a suitable plasticiser or blend of plasticisers such that they preferably have the following complex viscosities ($\eta^*$):

50 poise$<\eta^*<$4000 poise, preferably 100 poise$<\eta^*<$2000 poise, more preferably 100 poise$<\eta^*<$1000 poise, at a frequency of 1 rad/s at a temperature of 210° C. or less and $\eta^*<$2000 pose, preferably $\eta^*<$1000 poise, more preferably $\eta^*<$500 poise, at a frequency of 1000 rad/s at a process temperature (T) of 210° C. or less, wherein $\eta^*$ represents the complex viscosity of the thermoplastic polymeric hydrophilic composition. Preferably the temperature T is 200° C. or less and more preferably 180° C. or less and most preferably from 200° C. to 50° C.

According to this preferred embodiment of the present invention the thermoplastic hydrophilic polymeric compositions having the complex viscosity described above allow for a film or layer to be coated onto a substrate using typical coating conditions and apparatuses known in the art for the coating of low viscosity hot melt compositions in a layer having a required thickness onto a substrate, while also keeping the advantageous characteristics of the preferred thermoplastic hydrophilic polymers in providing hydrophilic continuous moisture vapour permeable, liquid impermeable layers or films.

Thermoplastic hydrophilic polymeric compositions having such viscosities can also provide very thin films or layers.

Suitable compatible plasticisers comprised in the thermoplastic hydrophilic polymeric composition according to this preferred embodiment of the present invention include citric acid esters, tartaric acid esters, glycerol and its esters, sucrose esters, adipates, sebacates, sorbitol, epoxidized vegetal oils, polymerised vegetal oils, polyols, phthalates, liquid polyesters, glycolates, aromatic sulfonamides, benzoates, glycols and polyglycols and their derivatives, sorbitan esters, phosphates, monocarboxylic fatty acids ($C_8$-$C_{22}$) and their derivatives, polyethers and their derivatives, and mixtures thereof.

According to a particularly preferred embodiment of the present invention particularly preferred plasticisers are hydrophilic plasticisers such as citric acid esters, aromatic sulfonamides, benzoates, polyethers and their derivatives, and mixtures thereof, some of them as disclosed in our application WO 99/64505. Said particularly preferred hydrophilic plasticisers have a particularly high polar character and provide the further advantage that they do not impair, and possibly can even enhance, the moisture vapour permeability of the resulting layer or film of the present invention formed from the preferred thermoplastic hydrophilic polymeric composition comprising said plasticiser or blend of plasticisers, when compared to a corresponding film or layer formed from a thermoplastic hydrophilic polymeric composition comprising the same components, but without the plasticiser or plasticizers.

The particularly preferred hydrophilic plasticiser or blend of hydrophilic plasticisers can of course also adjust the viscosity of the thermoplastic composition according to a preferred embodiment of the present invention to the preferred values in order to make it processable by coating said thermoplastic composition onto a substrate in a layer or film having a desired thickness.

Preferably the thermoplastic polymeric hydrophilic composition comprised in the films or layers of the present invention comprises from 30% to 55%, preferably from 35% to 50%, more preferably from 35% to 45%, by weight of the thermoplastic polymeric hydrophilic composition, of the thermoplastic hydrophilic polymer or mixture of thermoplastic hydrophilic polymers, from 5% to 35%, preferably from 10% to 30%, more preferably from 15% to 25%, by weight of the thermoplastic hydrophilic polymeric composition, of the functionalized copolymer or blend of functionalized copolymers containing functional groups, and from 15% to 70%, preferably from 25% to 60%, more preferably from 35% to 50%, by weight of the thermoplastic hydrophilic polymeric composition, of the suitable compatible plasticiser or blend of suitable compatible plasticisers.

More preferably, in the thermoplastic polymeric hydrophilic composition comprised in the films or layers of the present invention the thermoplastic hydrophilic polymer, or the mixture of thermoplastic hydrophilic polymers, and the functionalized copolymer, or the blend of functionalized copolymers having the functional groups, are in a weight ratio from 1.2 to 3, preferably from 1.3 to 2.5, more preferably from 1.4 to 2.2; most preferably, the weight ratio is about 2, which can provide an optimal combination of particularly moisture vapour permeability and mechanical strength in the films or layers of the present invention.

According to a particularly preferred embodiment of the present invention, the molecular weight of the functionalized copolymer or copolymers can also be suitably selected. It has been discovered that a film or layer according to the present invention having an even increased mechanical strength may be prepared from a thermoplastic hydrophilic polymeric composition comprising a functionalized copolymer or a blend of functionalized copolymers, wherein said functionalized copolymer or copolymers have a relatively high molecular weight. An indication of the molecular weight of the functionalized copolymer or copolymers is given by the respective Melt Flow Index (M.F.I.), evaluated at certain conditions according to any method known in the art. According to this preferred embodiment of the present invention, functionalized copolymer or copolymers are particularly preferred when they are selected in order to have a Melt Flow Index of less than 300 g/10 min, preferably of less than 100 g/10 min, more preferably comprised between 10 g/10 min and 50 g/10 min, wherein said Melt Flow Index is evaluated according to the ASTM test method D1238.

Although not particularly preferred, nor necessary, traditional known tackifying resins can also be included in the thermoplastic hydrophilic polymeric compositions comprised in the films or layers of the present invention, if for example a further enhancement of the tackiness level of the composition and/or a residual tackiness level is desired for some specific applications, if necessary with some decrease of the overall moisture vapour permeability of the film or layer. Suitable tackifying resins can be selected among rosins and rosin esters, hydrocarbon resins, aliphatic resins, terpene and terpene-phenolic resins, aromatic resins, synthetic $C_5$ resins, mixtures of synthetic $C_5$-$C_9$ resins, and mixtures thereof, as disclosed for example in our patent applications WO 99/64077 or WO 99/64505. The total amount of tackifying resins should be limited below 35% by weight of the thermoplastic hydrophilic polymeric composition. Preferably no tackifier resin should be included in the thermoplastic hydrophilic polymeric compositions comprised in the films and layers of the present invention.

The thermoplastic hydrophilic polymeric compositions comprised in the films or layers of the present invention may in addition comprise additional optional components to further improve the processability of the compositions and also the mechanical characteristics as well as other characteristics as resistance to ageing by light and oxygen, visual appearance etc., of the films or layers formed from such thermoplastic hydrophilic polymeric compositions. Such other optional components may include anti-oxidants, UV-stabilizers, pigments and mixtures thereof, which may be present within the composition at a level of up to 10% by weight of the composition.

A thermoplastic hydrophilic polymeric composition comprised in the films or layers according to the present invention can be manufactured with any known process that will typically comprise the steps of providing at least the thermoplastic hydrophilic polymer or mixture of polymers, the functionalized copolymer or blend of functionalized copolymers containing the functional groups, and the suitable compatible plasticiser or blend of suitable compatible plasticisers, and optionally any further additional components as explained above, heating the components and compounding them, e.g. with a known suitable mixer to form the thermoplastic hydrophilic polymeric composition in the molten state for subsequent process steps.

Alternatively, solvent or emulsion systems can be created and used to process the thermoplastic hydrophilic polymeric compositions comprised in the films or layers of the present invention, either as an intermediate or final step in making moisture vapour permeable, liquid impermeable films or layers from said compositions, composite laminated structures comprising said films or layers, and articles comprising said films or layers or said structures.

According to the present invention, the liquid impermeable, moisture vapour permeable films or layers comprising the thermoplastic hydrophilic polymeric compositions as described above, have a high moisture vapour permeability, and at the same time possess an increased mechanical strength. Without being bound to any theory, it is believed that in the compositions described above the presence of the copolymer or copolymers having functional groups provides the composition with said increased mechanical strength, while keeping the high moisture vapour permeability, and the low viscosity in the molten state, achieved by the addition of preferred high amounts of suitable compatible plasticiser or plasticisers in the composition.

As will be explained in more detail hereinbelow, with specific reference to alternative processes for the formation of films, or layers, or laminated structures comprising the thermoplastic hydrophilic polymeric compositions described above, said thermoplastic hydrophilic polymeric compositions also possess a better capability to adhere to a substrate, typically in the molten state, which is particularly advantageous in the formation of composite laminated structures by direct application of the thermoplastic hydrophilic polymeric composition in a layer having a desired thickness onto a selected substrate, e.g. a nonwoven. Preferably, the direct application is a coating performed by known hot melt coating techniques using low viscosity thermoplastic hydrophilic polymeric compositions as described herein. In this context, the low viscosity and high adhesiveness in the molten state at the process conditions of the thermoplastic hydrophilic polymeric compositions disclosed so far provide for a simple and cheap formation process, and at the same time results in a composite laminated structure having an increased bond strength, and hence a better resistance to delamination under stresses and strains during the use, in addition to the increased mechanical strength of the film or layer per se.

Moreover, the addition of the copolymer or copolymers having functional groups to the thermoplastic hydrophilic polymeric composition comprised in the films or layers of the present invention provides said better mechanical strength of the resulting film or layer as such, together with the preferred better adhesion to a substrate of the composition typically in the molten state, but without leaving a residual permanent tackiness in the composition after setting, or drying, at room temperature, contrary to what can be achieved by the simple inclusion into the thermoplastic hydrophilic polymeric composition of known tackifier resins in place of the selected functionalized copolymer or copolymers. Addition of a known tackifier moreover does not provide any increase in the mechanical strength of the film or layer per se and may, in some cases, decrease the overall moisture vapour permeability of the resulting film or layer. The lack of permanent residual tackiness constitutes an advantage, since a film, a layer, or a composite laminated structure comprising the thermoplastic hydrophilic polymeric compositions described above can be produced without the need of a release liner, e.g. a silicone-coated release paper, on the production line, and after cooling and setting can be rolled and stored as such, with no risk of self adhesion.

Permanent residual tackiness of a film or layer comprised in a composite laminated structure, consisting e.g. in a layer of a hydrophilic thermoplastic polymeric composition coated onto a nonwoven substrate, can also in some cases, and under certain usage conditions, reduce the abrasion resistance of the laminated composite structure, and eventually lead to delamination of the same. The abrasion resistance of a laminated structure can be measured according to test methods well known in the art, such as the SATRA Test Method PM 31, from the SATRA Equipment Instructions STM.105/M.

A good indication of the mechanical strength of a film or layer according to the present invention is provided by the elastic modulus G' of the thermoplastic hydrophilic polymeric composition, comprised in the film or layer, measured at given conditions, namely at 25° C. and at a frequency of 1 rad/s, as better specified hereinbelow with reference to the test methods.

According to the present invention, the addition of specific amounts of functionalized copolymer or copolymers to a thermoplastic hydrophilic polymeric composition typically comprising a thermoplastic hydrophilic polymer or mixture of thermoplastic hydrophilic polymers and a suitable compatible plasticiser or blend of plasticisers increases the mechanical strength of a film or layer comprising, and typically formed from, said thermoplastic hydrophilic polymeric composition, and this is reflected by a corresponding general increase in the $G'_{25}$ of the thermoplastic hydrophilic polymeric composition comprising the functionalized copolymer or copolymers, compared to the same compositions without the functionalized copolymer or copolymers.

According to a particularly preferred embodiment the present invention, it is possible to evaluate the percent increase $\Delta G'_{25}$ of the elastic modulus in a thermoplastic hydrophilic polymeric composition comprising one thermoplastic hydrophilic polymer, a suitable compatible plasticiser or blend of plasticisers, and a functionalized copolymer or copolymers, compared to a composition comprising the same components, but without any functionalized copolymer or copolymers. In order to have a particularly meaningful comparison, the two compositions shall have the same polymer/plasticiser weight ratio, wherein the polymer amount at the numerator consists in the total weight of the thermoplastic hydrophilic polymer and, when present, of the functionalized copolymer or copolymers, and the plasticiser amount at the denominator consists in the same weight of plasticiser, or plasticisers, in the two compositions under comparison. In other words, in order to evaluate the effect on the $G'_{25}$ of the thermoplastic hydrophilic polymeric composition, and hence on the mechanical strength of films and layers formed therefrom, of the addition of the functionalized copolymer or copolymers in a thermoplastic hydrophilic polymeric composition, the comparison is made between two compositions having the same polymer content, expressed in terms of a constant polymer/plasticiser ratio, wherein in the composition with the functionalized copolymer or copolymers said copolymer or copolymers actually replace a portion of the thermoplastic hydrophilic polymer of the reference composition, while keeping the polymer/plasticiser ratio constant.

According to this preferred embodiment of the present invention, said percent increase $\Delta G'_{25}$ is at least 20%, preferably at least 25%, more preferably at least 50%, and most preferably at least 80%; percent increases $\Delta G'_{25}$ of at least 100% are also possible and highly preferred.

The percent increase $\Delta G'_{25}$ as defined above, and more in general the increase of the $G'_{25}$, are generally more important than the absolute values for the $G'_{25}$ of the thermoplastic hydrophilic polymeric compositions comprised in the films or layers according to the present invention, which in turn may vary in a very broad range. In principle, thermoplastic hydrophilic polymeric compositions having an elastic modulus $G'_{25}$ higher than 800,000 Pa, preferably higher than 850,000 Pa, more preferably higher than 1,200,000 Pa, and even more preferably higher than 2,000,000 Pa, are preferred, but even higher values for $G'_{25}$ of more than 3,000,000 Pa, more than 4,000,000 Pa, and more than 5,000,000 Pa, are achievable according to the present invention, and highly preferred for specific product applications, as will be shown in the examples provided herein below.

It has to be noted that the theoretical conditions defined for the evaluation of the percent increase $\Delta G'_{25}$ also apply to the actual production of films ad layers according to the present invention. According to the present invention, it is in fact possible to provide a film or a layer having the increased mechanical strength, and also the increased bond strength if comprised in a composite laminated structure, together with high moisture vapour permeability, said film or layer being also cheaper. The film or layer in fact comprises a thermoplastic hydrophilic polymeric composition in which a portion of the relatively more expensive thermoplastic hydrophilic polymer is actually replaced by the relatively less expensive functionalized copolymer or copolymers.

The bond strength of a composite laminated structure comprising a film or layer of the thermoplastic hydrophilic polymeric composition applied, e.g. coated, onto a substrate can be measured as the peel force necessary to separate the film or layer from the substrate, as will be explained in more detail below with reference to the test methods.

According to the present invention a moisture vapour permeable, liquid impervious film or layer can be formed from the thermoplastic hydrophilic polymeric composition of the present invention, for example by laying with a known method said thermoplastic hydrophilic polymeric composition onto a formation substrate. Then after setting or drying, depending on the selected formation method, the film or layer is separated from said formation substrate. The films or layers of the present invention formed from the thermoplastic hydrophilic polymeric compositions preferably have a moisture vapour transmission rate of at least 300 g/m² 24 h, more preferably of at least 500 g/m² 24 h, even more preferably of at least 600 g/m² 24 h, most preferably of at least 1000 g/m² 24 h, with a thickness of said layer or film of at least 15 μm, said water vapour transmission rate measured according to the modified ASTM E-96B "Upright Cup" Method.

The films or layers of the present invention, as already explained, are typically continuous and provide a high degree of liquid impermeability in addition to moisture vapour permeability. The liquid impermeability can be evaluated according to any suitable method known in the art, such as for example in terms of hydrostatic head according to the Liquid Impermeability Test method described hereinbelow.

Preferably, a film or layer according to the present invention, or alternatively a composite laminated structure comprising said film or layer, has a liquid impermeability of at least 100 mbar, preferably of at least 200 mbar, more preferably of at least 300 mbar, most preferably of at least 400 mbar, said values measured according to the Liquid Impermeability Test described herein.

According to the present invention, films or layers can be formed from the thermoplastic hydrophilic polymeric compositions described so far which have a thickness of from about 0.5 μm to about 200 μm and above, said films or layers being usable as such, or in combination with different substrates, such as for example in a composite laminated structure comprising a nonwoven fibrous substrate.

More in general, the thickness of the films or layers of the present invention formed from the thermoplastic hydrophilic polymeric compositions as described herein can be constant or vary within the structure. Though not limited to any specific thickness range, depending upon application there may be preferred ranges. For example, the preferred range for a film or layer comprised in a disposable article may desirously range from as thick as 400 microns down to less than 0.5 microns and more preferably, in certain cases, substantially less than 0.5 microns. In contrast, a construction or even packaging application may, for certain reasons, dictate a preferred range from 200 to 2000 microns or even thicker for the film or layer.

Various known processes can be used for making a film or layer according to the present invention.

A process for making a layer or film according to the present invention from a thermoplastic polymeric hydrophilic composition as described above typically comprises the steps of providing said composition, heating it to make it flowable, and forming said composition in the molten, semi-molten, or plastic state onto a substrate in a layer or film having the desired thickness, e.g. with a film extrusion process, or with a hot melt coating process, depending on the viscosity achieved for the composition at the process conditions, as explained above. While in principle said substrate can be simply a formation substrate, onto which the thermoplastic hydrophilic polymeric composition is formed in order to make a film or layer of the desired thickness which is subsequently separated from said substrate and used as such, in a preferred embodiment of the present invention a moisture vapour permeable, water impervious composite laminated structure can be formed which comprises the thermoplastic hydrophilic polymeric composition and, a suitable substrate onto which said thermoplastic composition is laid, wherein the substrate is also preferably moisture vapour permeable. The increased adhesiveness to the substrate imparted to the thermoplastic hydrophilic polymeric composition by the addition of the functionalized copolymer or copolymers according to the present invention in fact typically provides for an increased adhesion of the film or layer in the molten, semi-molten, or plastic state to the substrate, for example a fibrous substrate such as a nonwoven layer comprising hydrophobic synthetic fibres, while at the same time keeping a high breathability of the film or layer, and hence preferably of the whole composite laminated structure.

This in turn provides a better integrity of the resulting composite laminated structure, which is therefore more resistant to e.g. delamination in use, also with very thin layers of the thermoplastic hydrophilic polymeric composition, wherein said improved adhesive properties of the composition in the molten, semi-molten, or plastic state, and said better resistance of the resulting composite structure are combined with a very limited, or no detrimental effect at all on the water vapour transmission capability of the layer of the present invention formed from the thermoplastic hydrophilic polymeric composition, for example if compared to a layer of the same thickness formed from a similar composition, not comprising the functionalized copolymer or copolymers.

Other known processes can be used for making moisture vapour permeable, liquid impermeable films or layers, or laminated structures comprising said films or layers according to the present invention from the thermoplastic hydrophilic polymeric compositions, and articles comprising said structures.

A class of such methods is generally described as "moulding" where the material is often shaped in a film or layer having the desired shape via use of male or female moulds or combinations of moulds. Depending on the technique, certain processing temperature and pressure (or vacuum) conditions may be preferred for production of a given structure or article. Such known moulding methods include, but are not limited to: dip moulding, blow moulding, injection moulding, compression moulding, thermoforming, vacuum thermoforming, extrusion moulding, rotational moulding, slush moulding, etc.

Other known methods for processing the thermoplastic hydrophilic polymeric compositions to form a film or layer of the present invention also include: film and sheet casting; blown film techniques; an additional tentering process step; an additional calendering step; an additional quenching step; an additional heat treatment step; etc. The nature of the specific production conditions or type or order of process steps will vary depending on the chosen making technique, environmental condition, material format, etc. For example, a process step may need to be included to remove: (i) solvent if a solvent-based format of the raw material form of the thermoplastic hydrophilic polymeric composition is chosen; (ii) water if an emulsion-based format of the raw material form of the thermoplastic hydrophilic polymeric composition is chosen; or, (iii) heat if a hot melt format of the raw material form of the thermoplastic hydrophilic polymeric composition is chosen, as already disclosed above.

A film or sheet can be produced with two or more layers where at least one of the layers is a film or layer according to the present invention comprising the thermoplastic hydrophilic polymeric composition described so far. This can be accomplished by a variety of known means, including but not limited to: co-extrusion, extrusion coating, etc.

While it may be at times preferable that the entire structure or article be comprised solely of a film or layer of the present invention, the structure or the article can be a composite with one or more other materials. The composite, for example, can involve two or more films or layers of the present invention comprising the same thermoplastic hydrophilic polymeric composition or different specific thermoplastic hydrophilic polymeric compositions as described above.

In turn, a film or layer according to the present invention is preferably entirely made of a thermoplastic hydrophilic polymeric composition as described above.

Alternatively, the composite can involve at least one film or layer of the thermoplastic hydrophilic polymeric composition in combination with one or more other materials. Such materials include, but are not limited to: fibres, fibrous batts, non-wovens, wovens, papers, metal foils, micro-porous or porous membranes, films such as polymeric films, inorganic structures such as compressed gypsum sheets, perforated or apertured films and papers, macroscopically expanded films, cloth, substantially rigid fibre-based materials such as lumber, etc.

Said other components may be non-absorbent, absorbent, liquid-containing, etc.

Another useful technique for making a film or layer according to the present invention is the process of spray coating. The described thermoplastic hydrophilic polymeric composition lends itself to a heated spraying technique whereas upon heating the viscosity is sufficiently lowered to allow spray coating or sputtering. Such thermoplastic hydrophilic polymeric composition spray coating can occur with the aid of a mould, either male or female, to build surfaces or walls of the article. Afterward, the article and mould (or mould parts) are separated from each other. Alternately, the spray coating method can employ different starting raw material formats of the thermoplastic hydrophilic polymeric composition such as a solvent-based approach or an emulsion.

For a composite article employing the spray coating approach, the other material may provide sufficient three dimensional structure by itself such that the other material acts as the mould, after which it is sufficiently coated the composite article is complete, avoiding the before-mentioned separation of article from mould.

In an embodiment of the present invention a moisture vapour permeable, liquid impervious composite layered structure can be provided wherein the contribution of the layer formed from the thermoplastic hydrophilic polymeric composition to the overall performance of the composite material can mainly reside in the provision of a breathable liquid barrier and hence could be advantageously provided as thinly as possible. The remaining performance physical criterion is then preferably provided by the provided substrate, which therefore preferably acts also as a support layer. The films or layers of the present invention provide in this particular embodiment the main advantage of a better resistance to delamination of the composite laminated structure, owing to the increased bond strength between the film or layer and the substrate.

The substrate, or support layer may be any useful layer which is preferably also moisture vapour permeable, preferably having a moisture vapour permeability of at least 100 $g/m^2$ 24 h, more preferably at least 300 $g/m^2$ 24 h, and most preferably at least 500 $g/m^2$ 24 h.

Suitable substrates for use herein as support layers include two dimensional, planar micro and macro-porous films; macroscopically expanded films; formed apertured films; non-woven and woven layers. According to the present invention the apertures in said layer may be of any configuration, but are preferably spherical or oblong and may also be of varying dimensions. The apertures preferably are evenly distributed across the entire surface of the layer, however layers having only certain regions of the surface having apertures are also envisioned.

Suitable two dimensional porous planar layers may be made of any material known in the art, but are preferably manufactured from commonly available polymeric materials. Suitable materials are for example Goretex™ type materials well known in the art for their application in so-called breathable clothing. Other suitable materials include XMP-1001 of Minnesota Mining and Manufacturing Company, St. Paul, Minn., USA and Exxaire XBF-101W, supplied by the Exxon Chemical Company. As used herein the term two dimensional planar layer refers to layers having a depth of less than 1 mm, preferably less than 0.5 mm, wherein the apertures have an average uniform diameter along their length and which do not protrude out of the plane of the layer. The apertured materials for use in the present invention may be produced using any of the methods known in the art such as described in EPO 293 482 and the references therein.

Suitable apertured formed films include films which have discrete apertures which extend beyond the horizontal plane of the surface of the layer thereby forming protuberances. The protuberances have an orifice located at its terminating end. Preferably said protuberances are of a funnel shape, similar to those described in U.S. Pat. No. 3,929,135. The apertures located within the plane and the orifices located at the terminating end of protuberance themselves maybe circular or non circular provided the cross sectional dimension or area of the orifice at the termination of the protuberance is smaller than the cross sectional dimension or area of the aperture located within the surface of the layer. Preferably said apertured preformed films are unidirectional such that they have at least substantially, if not complete one directional fluid transport.

Suitable macroscopically expanded films for use herein include films as described in for example in U.S. Pat. No. 4,637,819 and U.S. Pat. No. 4,591,523.

Preferred support layers for use herein in composite laminated structures include woven and nonwoven layers, most preferably hydrophobic fibrous layers such as hydrophobic nonwovens.

The composite layered structures of this preferred embodiment of the present invention are particularly advantageous as they allow the possibility of providing a composite wherein the thermoplastic composition may be formed onto the support substrate as a layer with the desired thickness. By e.g. suitably tailoring the viscosity of the thermoplastic hydrophilic polymeric composition at the process conditions as explained above, typical coating conditions and apparatuses known in the art for the direct coating of low viscosities hot melts can be readily utilised in order to provide the thermoplastic hydrophilic polymeric composition at the desired thickness onto the substrate. Alternatively, other known processes such as film extrusion can be used in case of thermoplastic hydrophilic polymeric compositions according to the present invention having a higher viscosity at the process conditions.

A possible method for forming a composite laminate by coating the thermoplastic composition onto a substrate acting as a support layer is described in PCT application WO 96/25902.

The liquid impermeable, moisture vapour permeable layers or films of the present invention both used as layers or films as such, or in composites such as laminated structures formed therefrom, find utility in a number of applications wherein liquid imperviousness and moisture vapour permeability are desirable, together with increased mechanical strength of the film or layer, and preferably also increased resistance to delamination due to better bond strength of laminated structures comprising said films or layers.

Said structures can be typically disposable, e.g. laminated structures with a nonwoven as a substrate, or alternatively durable or semi-durable, such as for example laminated structures comprising a textile or a fabric as a substrate or support.

In particular the present invention can be effectively utilised within personal care products, such as absorbent articles, wound care articles, or cosmetics. Non limiting examples are absorbent articles such as diapers, sanitary napkins, panty liners, incontinence products and breast pads, wherein the films or layers of the present invention are typically comprised in a breathable backsheet element, for example constituted by a composite laminated structure comprising a film or layer adhered onto a nonwoven; wound and burn dressings and bandages, warming or cooling pads for medical use; patches, bandages or wraps, e.g. for medical or cosmetic treatment, which may contain and deliver active substances; perspiration pads such as underarm-, wrist- and head perspiration pads, collar inserts, shoe Inserts, hat bands, etc.

Other articles comprising the films or layers of the present invention comprise protective articles for the body, or for body parts. Non limiting examples comprise protective clothing such as working or surgical gowns and the like; hand coverings such as gloves, finger cots, mitts, mittens; foot or leg coverings such as socks, hose, pantyhose, shoes, slippers; head coverings such as hats, caps; prophylactic and contraceptive mechanical articles such as condoms; face coverings such as face masks, nose covers, ear covers or mitts; sport and fitness wearing articles, wind cheaters, sleeping bags; body support items such as male organ "athletic" supporters, brassieres; clothing for use as underwear, protective sleeves, or as a part of or wholly incorporated into protective pads. Other example articles and applications include but are not limited to: flexible or drapable clothing articles for humans such as the non-limiting examples of shirts, pants, undergarments, bibs, smocks, coats, scarves, body wraps, stockings, leggings, skirts, dresses, etc.; other flexible or drapable clothing or protecting sheets for various tasks and occupations including medical professions, agricultural jobs, mechanical assembly and repair, emergency public services, the military, athletic endeavours, cleaning positions; protective garments for animals.

A further category of articles comprising the films or layers of the present invention comprises articles for protecting objects. Preferred protecting articles comprise protecting bedding covers such as linen, mattress and pillow covers. Also protecting covers for cushions, comforter, duvets, upholstered portions of beds, such as headboards, or of sofas or armchairs are comprised. Other non limiting examples comprise protective articles such as dust covers for electronic/electrical products (e.g. computer keyboards, hard drives, video recorders, etc.), headrest covers for seats in vehicles, e.g. aeroplanes/trains, shrink wraps, one-use table covers, etc. Articles for packaging such as for food products such as fresh produce and baked goods (bread, rolls, cakes), e.g. bags for food storage in the refrigerator, or also packaging films for microwave oven, or packages for hot "take away" foods, e.g. pizzas. Further examples comprise articles for agriculture and horticulture such as, as non-limiting examples, an individual article (container, three dimensional "bag") which is placed to partially or totally enclose an individual or specific group of plants. Protective furniture coverings such as protective covers for upholstered chairs and sofas, etc. are also comprised. Other alternative protecting articles comprise construction roofing materials and house wrapping, ski, windsurf and bike/motor bike overalls, backings for carpets and wallpapers, camping tents, protecting sheets for various items (e.g. cars, tennis courts, sport grounds, etc.), sheets for gardens/greenhouses protection, tents for closing/protecting tennis courts, sport grounds, items for protection of plants from low temperatures, etc.

Alternative applications in which the films or layers of the present invention are directly formed via spraying/brushing/roll coating, typically in the form of a solvent or emulsion based composition and at room temperature, comprise protective, possibly peelable coatings for hard surfaces such as stone, concrete, wood (e.g. furniture), for coating/water proofing of shoes/leather articles or textiles, protective coatings for cars (e.g. during transport by ship), protective coatings for cars, boats etc. during long periods of non use.

More in general, whenever possible in the many different applications mentioned above, the films or layers of the present invention can be either provided as an already formed layer or structure, or alternatively also applied in liquid form, e.g. sprayed or brushed, and hence forming the film or layer upon setting or drying, and also possibly comprising active agents, for example to the body, e.g. in a cosmetic, medical, or protective composition, or to plants.

In general all articles comprising the films or layers of the present invention can be generally flexible or rigid.

Preferably the moisture vapour permeable, liquid impervious films or layers of the present invention, also comprised in composite layered structures, have an overall moisture vapour transfer rate (WVTR) of at least 300 g/m$^2$ 24 h, preferably at least 500 g/m$^2$ 24 h, more preferably at least 600 g/m$^2$ 24 h, and most preferably at least 1000 g/m$^2$ 24 h.

A moisture vapour permeable, liquid impervious composite structure comprising a film or layer according to the present invention directly applied onto a suitable substrate finds particular utility as the backsheet for disposable absorbent articles, especially sanitary napkins and panty liners, but also diapers, incontinence products and breast pads. The increased mechanical resistance and bond strength of the composite laminated structure is preferred since it can withstand the stresses and strains to which it is subjected during the use of such products, in combination with the desired liquid imperviousness and moisture vapour permeability. Such articles will typically comprise components known to the skilled person such as a liquid pervious topsheet, an absorbent core and a backsheet and may optionally also comprise other components such as fastening means, wings, and the like.

EXAMPLES

The present invention will be illustrated with the following examples. All compositions in all examples herein are given in percent by weight, unless otherwise stated.

Examples 1-9

The formulations for Examples 1-9 are given in Table 1. The compositions are prepared as hot melts in a laboratory mixer. The antioxidant Irganox B225 available from Ciba Geigy (Switzerland) is added at a level of 0.5% by weight to all compositions. Films of about 20 μ thickness for the measurement of moisture vapour transmission rate are cast from an appropriate solvent, onto a glass plate measuring 30×20 cm, using a K Hand Coater No. 150 available from RK Print Instruments Ltd (US). The solution contains 10% by weight of the thermoplastic polymeric composition, and after complete evaporation of the solvent, the films obtained have the desired thickness. Different solvents can be used according to the thermoplastic polymers contained in the composition, as can be readily determined by the skilled man; a 2:1 mixture of toluene and tetrahydrofuran was used for Examples 1-6, and tetrahydrofuran was used for Examples 7-9.

TABLE 1

| Material | 1 | 2 | 3 | 4 | 5 | 6 | 7 | 8 | 9 |
|---|---|---|---|---|---|---|---|---|---|
| Pebax 2533 | 50 | 40 | 40 | 40 | 40 | 40 | | | |
| Benzoflex 988 | 50 | 40 | 40 | 40 | 40 | 40 | | | |
| Primacor 5980 | | | 20 | | | | | | |
| Fusabond 190D | | | | 20 | | | | | |
| Lotader 4700 | | | | | 20 | | 10 | | |
| Bynel 2002 | | | | | | 20 | | | |
| Hytrel 3046 | | | | | | | 50 | 40 | 40 |
| Citrofol Bl | | | | | | | 50 | 40 | 40 |
| Lotader 8900 | | | | | | | 10 | 20 | |
| Elvaloy PTW | | | | | | | | | 20 |
| WVTR (g/m² ·24 h) | 1519 | 983 | 1343 | 1303 | 1053 | 1030 | 1928 | 1395 | 1492 |
| G' 25° C., (Pa) | 800,000 | 1,100,000 | 1,000,000 | 1,200,000 | 4,000,000 | 2,100,000 | 630,000 | 870,000 | 840,000 |

In the examples, the following raw materials are utilised:
Pebax 2533: A polyether amide polymer available from Atofina (France);
Hytrel 3046: A polyether ester copolymer available from Dupont (US);
Primacor 5980: A copolymer of ethylene and acrylic acid containing 20 wt % acrylic acid available from Dow Chemicals (US);
Primacor 3460: A copolymer of ethylene and acrylic acid containing 9.7 wt % acrylic acid available from Dow Chemicals (US);
Fusabond 190-D: An anhydride-modified copolymer of ethylene and vinyl acetate available from Dupont (US);
Lotader 4700: A terpolymer of ethylene, an acrylic ester and maleic anhydride available from Atofina (France);
Lotader 8900: A terpolymer of ethylene, an acrylic ester and glycidyl methacrylate available from Atofina (France);
Elvaloy PTW: A terpolymer of ethylene, n-butyl acrylate and glycidyl methacrylate available from Dupont (US);
Bynel 2002: An acid-modified copolymer of ethylene and an acrylic ester available from Dupont (US);
Benzoflex 988: A benzoate plasticiser available from Velsicol (US);
Citrofol Bl: A citric acid ester plasticiser available from Jungbunzlauer (Switzerland);
Zn ionomer: an ionomer of an ethylene-methacrylic acid copolymer containing 15 wt % acrylic acid and having a melt flow index (190° C./2.16 kg) of 14 g/10 min available from Aldrich (US) with product no. 42,666-0.

Comparative Example 1 consists of a 1:1 blend of the polyether block amide Pebax 2533 with the benzoate plasticiser Benzoflex 988, giving a WVTR of about 1500 g/m² 24 h at about 20 microns with an elastic modulus G'$_{25}$ of 800,000 Pa at 25° C. In each of examples 2-5, a copolymer containing acidic or anhydric functional groups has been introduced at a level of 20%; the ratio of hydrophilic polymer: plasticiser is maintained at 1:1. The results show that the WVTR values are maintained at an acceptable range (about 900-1300 g/m² 24 h), while the elastic moduli values are significantly enhanced, with values of up to 4,000,000 Pa being obtained. In Example 6, two different grades of the copolymer Lotader are used, one of which (Lotader 4700), contains the acidic maleic anhydride as the functional groups, while the other (Lotader 8900), has the basic epoxy group (on the glycidyl methacrylate comonomer) as the functional groups.

Comparative Example 7 consists of a 1:1 blend of the polyether ester Hytrel 3046 with the citric acid ester plasticiser Citrofol Bl, giving a WVTR of 1920 g/m² 24 h at about 20 microns with an elastic modulus of 630,000 Pa at 25° C. Examples 8 and 9 include two copolymers containing glycidyl methacrylate as a comonomer. This monomer introduces a pendant epoxy group into the polymer structure. In Examples 8 and 9 It can be seen that the WVTR value is maintained at an acceptable level, but that there is an increase in the value of the elastic modull, with values In the range of 840,000-870,000 Pa now being obtained.

Examples 10-13

The formulations for Examples 10-13 are given in Table 2. The compositions are prepared as hot melts in a laboratory mixer. The antioxidant Irganox B225 available from Ciba Geigy (Switzerland) is added at a level of 0.5% by weight to all compositions. Films of the desired thickness for the measurement of moisture vapour transmission rate are cast from an appropriate solvent, onto a glass plate measuring 30×20 cm, using a K Hand Coater No. 150 available from RK Print Instruments Ltd (US). The solution contains 10% by weight of the thermoplastic polymeric composition, and after complete evaporation of the solvent, the films obtained have the desired thickness as indicated in the table. Different solvents can be used according to the thermoplastic polymers contained in the composition, as can be readily determined by the skilled man; a 1:1 mixture of toluene and isopropanol was used for Examples 10-13.

TABLE 2

| Material | 10 | 11 | 12 | 13 |
|---|---|---|---|---|
| Pebax 2533 | 60 | 40 | 35 | 40 |
| Benzoflex 988 | 40 | 40 | 40 | 40 |
| Primacor 3460 | | 20 | 25 | |
| Zn Ionomer | | | | 20 |
| Thickness (μ) | 35 | 18 | 34 | 38 |
| WVTR (g/m² · 24 h) | 1323 | 1407 | 965 | 1376 |
| G' 25° C., (Pa) | 3,200,000 | 4,700,000 | 4,800,000 | 5,900,000 |
| ΔG'$_{25}$ (%) | — | 47% | 50% | 84% |

Examples 10-13 show the percent increase $\Delta G'_{25}$ of the elastic modulus $G'_{25}$ in some compositions comprised in films according to the present invention, compared to a reference (Comparative Example 10) with the same polymer/plasticiser ratio, and already having a rather high value of the $G'_{25}$ owing to the relatively high polymer content. The composition however, when applied to a substrate in order to form a composite laminated structure, e.g. by direct coating, has a very low bond strength.

Comparative Example 10 consists of a 60:40 blend of the polyether block amide Pebax 2533 with the benzoate plasticiser Benzoflex 988, giving an WVTR of 1322 g/m² 24 h at 35 microns with an elastic modulus of 3,200,000 Pa at 25° C. In each of examples 11-13, the total polymer content is maintained at 60% (constant polymer/plasticiser ratio), but a copolymer containing acidic or anhydric functional groups has been introduced at a level of between 20 and 25%. The results show that the WVTR values are maintained at an acceptable range (965-1407 g/m² 24 h), while the elastic moduli values are significantly enhanced, as shown by the $\Delta G'_{25}$, with values of up to 5,900,000 Pa being obtained.

By comparing Example 11 with Example 2, it can be noted the effect on the resulting elastic modulus $G'_{25}$, provided by the functionalized copolymer having a lower Melt Flow Index of Example 11, with respect to that of Example 2.

Examples 14-15

Two moisture vapour permeable, liquid impervious composite laminated structures according to the present invention are described in Examples 14-15. The formulations of the continuous thermoplastic film are given in Table 2. The antioxidant Irganox B225 is always added to all compositions at a level of 1% by weight.

TABLE 3

| Material | 14 | 15 |
|---|---|---|
| Pebax 2533 | 45 | 50 |
| Primacor 5980 | 20 | 25 |
| Citrofol Bl | 35 | 25 |
| Film basis weight (g/m²) | 20 | 23 |
| WVTR (g/m² · 24 h) | 1261 | 1030 |
| Hydrostatic Head (mbar) | 353 | 318 |
| Bond Strength (N/inch) | 0.47 | 0.97 |

The thermoplastic composition is directly coated onto a fibrous substrate in a continuous film having the desired basis weight as indicated in the table by a hot melt coating process. The fibrous substrate is an SMS (Spunbonded-Meltblown-Spunbonded structure) hydrophobic 100% polypropylene nonwoven with a basis weight of 24 g/m² (support layer) available from Corovin—BBA Nonwovens Group (Germany) under code G24 A10. The composite laminated structures have moisture vapour transmission rates of 1030-1261 g/m² 24 h. The liquid impermeability of the composite laminated structures is evaluated as the hydrostatic head, which determines the resistance to water penetration of the composite laminated structures, and namely of the film coated onto the fibrous substrate, which is water permeable per se. The samples show good bond strength values.

An example of a composite laminated structure according to the present invention is a liquid impermeable, moisture vapour permeable backsheet to be comprised in a sanitary article, e.g. a pantiliner. The composite laminated structure to be used as a breathable, liquid impervious backsheet in a pantiliner corresponds to that of Example 15 above.

Test Methods

Moisture Vapour Permeability.

The moisture vapour permeability of a film or layer, or of a composite laminated structure comprising said film or layer, is measured Water Vapour Transmission Rate (WVTR) at 25° C. and 50% relative humidity according to a modified version of the ASTM E-96B test method. The only modification to the standard method consists of a change in the air gap between the sample and the water surface in the cup, in which the height is 4 mm±0.5 mm, instead of 19 mm±2.5 mm, as specified in the standard method.

Complex Viscosity.

According to the present invention the complex viscosity $\eta^*$ of the thermoplastic hydrophilic polymeric compositions is measured using a RDA-II Rheometer available from Rheometrics Co. (US).

Melt Flow Index.

The Melt Flow Index of the functionalized copolymers Is evaluated according to the test method ASTM D1238.

Elastic Modulus.

The elastic moduli (G') of the thermoplastic hydrophilic polymeric compositions are measured at 25° C. at a frequency of 1 rad/s on a RDA-II Rheometer available from Rheometrics Co. (US). The samples are melted at 130° C., the gap between the parallel plates is reduced by 1 mm, and the sample cooled at a rate of 10° C./min. The modulus is measured at 25° C. at a frequency range of 0.1 rad/s–500 rad/s, and the value at 1 rad/s is taken.

Liquid Impermeability.

The liquid impermeability is measured as hydrostatic head of a film, layer, or a laminated composite structure comprising said film or layer, on a Textest F3000 Hydrostatic Head Tester available from Textest (Germany) according to the EDANA 120.1-80 test method.

Bond Strength.

The bond strength of the films or layers of the present invention to a substrate, in a composite laminated structure, is measured using an Instron 6021 dynamometer, available from Instron (US). The method measures the bond strength of a film/nonwoven composite laminated structure, but can be suitably applied by the skilled man to different composite laminated structures comprising alternative substrates. To make the measurement, a commercial adhesive tape, for example the Tesat®adhesive tape available from Beiersdorf, is applied to the face of the composite laminated structure containing the film, and a 2 kg hand roller is used (2 passes) to ensure a good, regular adhesion. Then, a 2.54 cm×25 cm sample is cut from the composite laminated structure, said sample comprising the adhesive tape adhered to the film, wherein the tape has such a width that it completely covers the sample. At one end of the sample, approximately 5 cm of the film is separated from the nonwoven, and placed in the upper jaw of the dynamometer. The nonwoven is placed in the other jaw, with enough tension to eliminate any slack, but with less than 5 g of force on the load cell. The testing apparatus and the data collection device are then started simultaneously, with the jaws separating at a speed of 500 mm/min. The values for the first 5 mm are discarded; the average of the values over a distance of 18 cm of the sample is taken as the bond strength.

The invention claimed is:

1. A composite laminated structure comprising:
   a nonwoven substrate;
   a liquid impermeable, moisture vapour permeable layer or film formed on said nonwoven substrate, wherein said layer or film further comprises a thermoplastic hydrophilic polymeric composition comprising:
   from about 30% to about 55%, by weight of a thermoplastic hydrophilic polymer or a mixture of thermoplastic hydrophilic polymers selected from the group consisting of polyurethanes, poly-ether-amide block copolymers, polyester-amide block copolymers, polymers and copolymers of polyethylene oxide, polymers and copolymers of lactide, and (co)polyamides, (co)polyesters, polyester block copolymers, sulfonated polyesters, poly-ether-ester block copolymers, poly-ether-ester-amide block copolymers, polyacrylates, polyacrylic acids and derivatives, polyethylene-vinyl acetate with a vinyl acetate content of at least 28% by weight, polymers and copolymers of vinyl ethers, poly-2-ethyl-oxazoline and derivatives, polymers and copolymers of vinyl pyrrolidone, thermoplastic cellulose derivatives, poly glycolide, polyureas, and mixtures thereof;
   from about 5% to about 35%, by weight of said thermoplastic hydrophilic polymeric composition of a functionalized copolymer or a blend of functionalized copolymers containing functional groups capable of interacting with said thermoplastic hydrophilic polymer or mixture of thermoplastic hydrophilic polymers; and
   from about 15% to about 70%, by weight of said thermoplastic hydrophilic polymeric composition, of a suitable compatible plasticiser, or a blend of suitable compatible plasticizers,
   wherein said functionalized copolymer or said blend of functionalized copolymers is selected from the group consisting of ethylene-(meth)acrylic acid copolymers, ethylene acrylic ester copolymers, ethylene methacrylic ester copolymers, ionomers, ethylene-vinyl ester-(meth) acrylic acid copolymers, ethylene-acrylic ester-(meth) acrylic acid copolymers, ethylene-vinyl ester-maleic anhydride copolymers, ethylene-acrylic ester-maleic anhydride copolymers, ethylene-vinyl ester-glycidyl methacrylate copolymers, ethylene-acrylic ester-glycidyl methacrylate copolymers, ethylene-maleic anhydride copolymers, ethylene-glycidyl methacrylate copolymers, styrene-maleic anhydride copolymers, styrene glycidyl methacrylate copolymers, styrene-ethylene-butylene-maleic anhydride copolymers, and mixtures thereof,
   wherein said layer or film comprising the thermoplastic hydrophilic polymeric composition has an elastic modulus $G'_{25}$ from higher than 800,000 Pa to 5,900,000 Pa, and
   wherein said functionalized copolymer or said blend of functionalized copolymers is selected from the group consisting of copolymers of ethylene with comonomers containing said functional groups.

2. The composite laminated structure according to claim 1, wherein said functionalized copolymer or said blend of functionalized copolymers is selected from the group consisting of ethylene-(meth)acrylic acid copolymers, ionomers, ethylene-vinyl ester-(meth)acrylic acid copolymers, ethylene-acrylic ester-maleic anhydride copolymers, ethylene-vinyl acetate maleic anhydride copolymers, ethylene-acrylic ester-glycidyl methacrylate copolymers, ethylene-glycidyl methacrylate copolymers, and mixtures thereof.

3. The composite laminated structure according to claim 1, wherein said functionalized copolymer or said blend of functionalized copolymers is selected from the group consisting of ethylene-acrylic acid copolymers, ethylene-acrylic ester-maleic anhydride copolymers, ethylene-vinyl acetate-maleic anhydride copolymers, ethylene-acrylic ester glycidyl methacrylate copolymers, ethylene-acrylic ester-acrylic acid copolymers, ethylene (meth)acrylic acid ionomers, and mixtures thereof.

4. The composite laminated structure according to claim 1, wherein said thermoplastic hydrophilic polymer or said mixture of thermoplastic hydrophilic polymers is selected from the group consisting of polyurethanes, (co)polyesters, polyester-amide block copolymers, polyether-amide block copolymers, polyether-ester-amide block copolymers and polyether-ester block copolymers, and mixtures thereof.

5. The composite laminated structure according to claim 4, wherein said thermoplastic hydrophilic polymer or said mixture of thermoplastic hydrophilic polymers is selected from the group consisting of polyurethanes, polyether-amide block copolymers, polyether-ester block copolymers, or mixtures thereof.

6. The composite laminated structure according to claim 1, wherein said thermoplastic hydrophilic polymeric composition comprises:
- from about 35% to about 50%, by weight of said thermoplastic hydrophilic polymeric composition, of said thermoplastic hydrophilic polymer or mixture of thermoplastic hydrophilic polymers,
- from about 10% to about 30%, by weight of said thermoplastic hydrophilic polymeric composition, of said functionalized copolymer or blend of functionalized copolymers, and
- from about 25% to about 60%, by weight of said thermoplastic hydrophilic polymeric composition, of said suitable compatible plasticiser or blend of suitable compatible plasticisers.

7. The composite laminated structure according to claim 6, wherein said thermoplastic hydrophilic polymeric composition comprises:
- from about 35% to about 45%, by weight of said thermoplastic hydrophilic polymeric composition, of said thermoplastic hydrophilic polymer or mixture of thermoplastic hydrophilic polymers,
- from about 15% to about 25%, by weight of said thermoplastic hydrophilic polymeric composition, of said functionalized copolymer or blend of functionalized copolymers, and
- from about 35% to about 50%, by weight of said thermoplastic hydrophilic polymeric composition, of said suitable compatible plasticiser or blend of suitable compatible plasticisers.

8. The composite laminated structure according to claim 1, wherein said thermoplastic hydrophilic polymer, or said mixture of thermoplastic hydrophilic polymers, and said functionalized copolymer, or said blend of functionalized copolymers, are in a weight ratio from about 1.2 to about 3.

9. The composite laminated structure according to claim 8, wherein said weight ratio is from about 1.3 to about 2.5.

10. The composite laminated structure according to claim 9, wherein said weight ratio is from about 1.4 to about 2.2.

11. The composite laminated structure according to claim 10, wherein said weight ratio is about 2.

12. The composite laminated structure according to claim 1, wherein said suitable compatible plasticiser, or said blend of suitable compatible plasticisers, is selected from the group consisting of citric acid esters, tartaric acid esters, glycerol and its esters, sucrose esters, adipates, sebacates, sorbitol, epoxidized vegetal oils, polymerised vegetal oils, polyols, phthalates, liquid polyesters, glycolates, aromatic sulfonamides, benzoates, glycols and polyglycols and their derivatives, sorbitan esters, phosphates, monocarboxylic fatty acids ($C_8$-$C_{22}$) and their derivatives, polyethers and their derivatives, and mixtures thereof.

13. The composite laminated structure according to claim 12, wherein said suitable compatible plasticiser, or said blend of suitable compatible plasticisers is selected from the group consisting of citric acid esters, aromatic sulfonamides, benzoates, polyethers and their derivatives, and mixtures thereof.

14. The composite laminated structure according to claim 1, wherein said layer or film is continuous and has a thickness of at least 15 μm.

15. The composite laminated structure according to claim 14, wherein said moisture vapour transmission rate (WVTR) is at least about 500 g/m$^2$·24 h.

16. The composite laminated structure according to claim 15, wherein said moisture vapour transmission rate (WVTR) is at least about 600 g/m$^2$·24 h.

17. The composite laminated structure according to claim 14, wherein said moisture vapour transmission rate (WVTR) is at least about 1000 g/m$^2$·24 h.

18. The composite laminated structure according to claim 1, wherein said thermoplastic hydrophilic polymeric composition has a percent increase $\Delta G'_{25}$ of the elastic modulus $\Delta G'_{25}$ of at least about 20% when compared to a composition comprising the same components, but without said functionalized copolymer or copolymers.

19. The composite laminated structure according to claim 18, wherein said percent increase $\Delta G'_{25}$ is at least about 25% when compared to a composition comprising the same components, but without said functionalized copolymer or copolymers.

20. The composite laminated structure according to claim 19, wherein said percent increase $\Delta G'_{25}$ is of at least about 50% when compared to a composition comprising the same components, but without said functionalized copolymer or copolymers.

21. The composite laminated structure according to claim 20, wherein said percent increase $\Delta G'_{25}$ is of at least about 80% when compared to a composition comprising the same components, but without said functionalized copolymer or copolymers.

22. The composite laminated structure according to claim 21, wherein said percent increase $\Delta G'_{25}$ is of at least about 100% when compared to a composition comprising the same components, but without said functionalized copolymer or copolymers.

23. The composite laminated structure according to claim 1, wherein said film or layer constitutes the backsheet of said disposable absorbent article.

24. The composite laminated structure according to claim 1, wherein said composite laminated structure constitutes the backsheet of said disposable absorbent article.

25. An absorbent article according to claim 23, comprising a sanitary napkin, a panty liner, or a disposable diaper.

26. An absorbent article according to claim 24, comprising a sanitary napkin, a pant liner, or a disposable diaper.

* * * * *